US012661533B2

(12) United States Patent
Allan et al.

(10) Patent No.: US 12,661,533 B2
(45) Date of Patent: Jun. 23, 2026

(54) LIGHTING FOR BREATHING APPARATUS

(71) Applicant: DRAEGER SAFETY UK LIMITED, Blythe (GB)

(72) Inventors: Jason Edward Allan, Tyne & Wear (GB); Darin Ferguson, Northumberland (GB); Mark Winship, Tyne and Wear (GB)

(73) Assignee: DRAEGER SAFETY UK LIMITED, Blyth (GB)

(*) Notice: Subject to any disclaimer, the term of this patent is extended or adjusted under 35 U.S.C. 154(b) by 442 days.

(21) Appl. No.: 18/017,483

(22) PCT Filed: Aug. 20, 2021

(86) PCT No.: PCT/EP2021/073146
§ 371 (c)(1),
(2) Date: Jan. 23, 2023

(87) PCT Pub. No.: WO2022/038267
PCT Pub. Date: Feb. 24, 2022

(65) Prior Publication Data

US 2023/0271035 A1 Aug. 31, 2023

(30) Foreign Application Priority Data

Aug. 20, 2020 (GB) ..................................... 2012997

(51) Int. Cl.

*A62B 9/04* (2006.01)
*A62B 9/00* (2006.01)
*G08B 21/18* (2006.01)

(52) U.S. Cl.
CPC ................ *A62B 9/04* (2013.01); *A62B 9/006* (2013.01); *G08B 21/18* (2013.01)

(58) Field of Classification Search
CPC ......... A62B 7/00-04; A62B 7/12; A62B 9/00; A62B 9/02; A62B 9/006; A62B 9/04;
(Continued)

(56) References Cited

U.S. PATENT DOCUMENTS 9,259,067 B2 * 2/2016 Kruse ...................... A45C 3/00
2004/0046710 A1 * 3/2004 Adams ................... A62B 9/006
345/8

(Continued)

FOREIGN PATENT DOCUMENTS

CN 101686749 A 3/2010
CN 204319548 U 5/2015

(Continued)

OTHER PUBLICATIONS

International Search Report and Written Opinion, dated Dec. 3, 2021, issued in priority International Application No. PCT/EP2021/073146.

(Continued)

*Primary Examiner* — Rachel T Sippel
(74) *Attorney, Agent, or Firm* — Banner & Witcoff, Ltd.

(57) ABSTRACT

Disclosed are breathing apparatus comprising lighting systems. Lighting modules are provided to illuminate in vertical and horizontal directions and to illuminate in a first lighting pattern if the determined status condition is a normal status condition and in a second lighting pattern if the determined status condition is an alert status condition.

14 Claims, 7 Drawing Sheets

(58) Field of Classification Search

CPC . A62B 25/00; B63C 11/22; B63C 2011/2281; A45F 3/10

See application file for complete search history.

(56) References Cited

U.S. PATENT DOCUMENTS

| | | | | |
|---|---|---|---|---|
| 2006/0174874 | A1* | 8/2006 | Jagger | A61M 16/101 128/201.25 |
| 2007/0090137 | A1 | 4/2007 | Kim | |
| 2008/0257928 | A1 | 10/2008 | Lowry et al. | |
| 2015/0151145 | A1* | 6/2015 | Tekelenburg | A62B 9/04 137/560 |
| 2016/0303406 | A1* | 10/2016 | Misra | A62B 7/02 |
| 2017/0072231 | A1 | 3/2017 | Carr et al. | |

FOREIGN PATENT DOCUMENTS

| | | | |
|---|---|---|---|
| CN | 106981147 | A | 7/2017 |
| GB | 2542176 | A | 3/2017 |
| KR | 20090045924 | A | 5/2009 |
| KR | 20120115646 | A | 10/2012 |
| KR | 2016-0010558 | A | 1/2016 |
| WO | 2005048769 | A1 | 6/2005 |
| WO | 2015081045 | A1 | 6/2015 |

OTHER PUBLICATIONS

European Search and Exam Report, dated Feb. 12, 2021, issued in priority GB Application GB2012997.9.

Jul. 1, 2025—(CN) Notification of the First Office Action—Appl No. 2021800509787.

Jun. 29, 2025—(CN) Search Report—Appl No. 2021800509787.

* cited by examiner

LIGHTING FOR BREATHING APPARATUS

CROSS-REFERENCE TO RELATED APPLICATIONS

This application claims the priority of International PCT Application No. PCT/EP2021/073146, filed on Aug. 20, 2021, which claims priority to GB Application No. GB2012997.9, filed on Aug. 20, 2020, the entire contents of which being fully incorporated herein by reference.

The present disclosure relates to lighting for breathing apparatus.

BACKGROUND OF THE INVENTION

Breathing apparatus, such as self-contained breathing apparatus, generally comprise a wearable backplate, which supports a container of breathing gas, and which is worn on a user's back with shoulder straps and a waist belt. Modern breathing apparatuses may have on-board electronics such as communication devices, telemetry, lights, cameras, sensors, amongst other electronic systems. These electronic systems may be powered by an on-board battery provided, for example, on the backplate.

Lighting on the backplate of a breathing apparatus is not typically used to illuminate the wearer's surroundings and is instead used to indicate an alarm situation to other team members, for example low air pressure or incapacitation of the wearer. However, current lighting solutions for breathing apparatus may not be visible or sufficiently conspicuous in certain scenarios (for example in thick smoke, or when the wearer is not in a direct line of sight), or may not provide sufficient information regarding the wearer's status.

Therefore, it should be understood that improvements in lighting systems for breathing apparatus may be desirable.

STATEMENTS OF INVENTION

According to an aspect of the present disclosure, there is provided a breathing apparatus comprising a wearable backplate comprising a longitudinally extending frame configured to be supported on a user's back. The frame comprises a cylinder support for supporting a breathing gas cylinder, and has an upper end configured to be arranged proximate the user's shoulders in use and a lower end configured to be arranged proximate the user's lower back or waist in use. The backplate comprises first and second lighting modules on opposing lateral sides of the cylinder support. The lighting modules comprise a vertical lighting array configured to project light longitudinally towards the upper end of the backplate and/or a horizontal lighting array configured to project light perpendicularly to the backplate. The breathing apparatus further comprises a controller configured to: receive data indicative of a status of the breathing apparatus and/or the user; determine a status condition of the breathing apparatus and/or the user; and control the lighting modules to illuminate in: a first lighting pattern if the determined status condition is a normal status condition; and a second lighting pattern if the determined status condition is an alert status condition.

It should be understood that the light may be emitted by the vertical and horizontal lighting arrays in a limited fan, arc, or cone which generally extends in the vertical or horizontal direction. The frame may comprise one or more generally longitudinally extending stanchions with one or more cross-elements extending therebetween, for example in a ladder-like arrangement. It should be further understood that a lighting array is a configuration of one or more light emitting components configured to emit light in the respective direction. In some examples, a single configuration of light emitting components may provide both arrays, separate lighting elements are not necessarily required for the two arrays (although in some examples, the arrays may comprise separate lighting components).

The first and second lighting patterns will be distinctive lighting patterns. A lighting pattern may include one or more of: blinking illumination (of constant or changing frequency), continuous illumination, use of different colours of lighting, lighting the lighting modules/arrays in a certain order. Using different lighting patterns to indicate different statuses may provide a clear indication to observers of the current status of the user and/or the breathing apparatus.

The first and second lighting modules may be arranged proximate the lower end of the frame. The lighting modules may be arranged below the cylinder support, or below the cylinder in use. By 'below' it should be understood that the lighting modules are closer to the lower end of the backplate than the cylinder or the cylinder support.

The first and second lighting modules comprise both a vertical lighting array configured to project light predominantly longitudinally towards the upper end of the backplate and a horizontal lighting array configured to project light predominantly perpendicularly to the backplate.

The first and second lighting modules comprise both a vertical lighting array configured to project light longitudinally towards the upper end of the backplate and a horizontal lighting array configured to project light perpendicularly to the backplate.

The wearable backplate may further comprise an electronics module which comprises one or more of the lighting modules, the controller, and a battery. The electronics module may be arranged proximate the lower end of the backplate. The electronics module may be a removable module.

By providing some or all of the electronic components, such as the lighting modules and/or the electronics module proximate the lower end of the backplate, the lighting modules may be closer to the other electronics, which may require reduced electronic cabling, and may help to consolidate the weight of the on-board electronics at the base of the user's spine. A lower centre of gravity for the breathing apparatus may reduce overall loading on the user, or the perceived weight of the load for the user.

The vertical lighting array and/or the horizontal lighting array may each comprise two or more differently coloured lighting elements for emitting light of different colours. For example, a first colour and a second colour may be used to indicate different statuses, or for different conditions, in addition to different lighting patterns for improved granularity of status indication. Three different coloured lighting elements may be provided in each array for further granularity of status indication.

The vertical lighting array may comprise light directing means. The light directing means may comprise a light pipe. The vertical lighting array light directing means may be configured to project light predominantly longitudinally towards the upper end of the backplate. The vertical lighting array may comprise a light pipe for directing light from a lighting element longitudinally towards the upper end of the backplate. The lighting elements may be arranged efficiently and the light pipe or pipes may direct or focus the light emitted.

The horizontal lighting array may comprise light directing means. The horizontal lighting array light directing means may be configured to project light predominantly perpendicularly to the backplate.

There may be provided one or more longitudinally extending reflective elements on the wearable backplate. In some examples, first and second reflective elements may be provided on opposing lateral sides of the cylinder support so as to reflect light projected longitudinally by the vertical lighting array. The reflective elements may be provided on longitudinally extending stanchions of the frame.

The wearable backplate may have a user-facing side configured to overlay the user's back in use, and an outward-facing side configured to face away from the user's back in use. The lighting modules may protrude from the outward-facing side of the backplate.

The lighting modules may extend through apertures in the wearable backplate to so as to protrude therefrom.

Each lighting module may be bordered at least partially by a peripheral blocking wall which is configured to block the projection of light by the lighting module in some directions.

The peripheral blocking wall of each lighting module may extend around a lower side and left and right sides of the lighting module to such that the lighting module is configured to project light substantially longitudinally towards the upper end of the backplate and substantially perpendicular to the outward-facing side of backplate.

The blocking wall may at least partially blocks the projection of light downward and laterally to the left or right.

The breathing apparatus may further comprise a breathing gas cylinder arranged on the cylinder support. One or more reflective elements may be provided on the breathing gas cylinder or a cover for the breathing gas cylinder for reflecting light emitted by the lighting modules.

First and second reflective cylinder elements may be provided on opposing lateral sides of the breathing gas cylinder or cover so as to reflect light projected longitudinally by the vertical lighting array. In some examples, the reflective cylinder elements may extend longitudinally along the lateral sides of the breathing gas cylinder or cover.

According to a second aspect, there is provided a breathing apparatus comprising a wearable backplate comprising a longitudinally extending frame configured to be supported on a user's back. The frame comprises a cylinder support for supporting a breathing gas cylinder, and has an upper end configured to be arranged proximate the user's shoulders in use and a lower end configured to be arranged proximate the user's lower back or waist in use. The backplate further comprises a lighting element configured to project light longitudinally towards the upper end of the backplate and an orientation sensor. The breathing apparatus further comprises a controller that is configured to receive data from the orientation sensor and determine the orientation of the backplate, and illuminate the lighting element if it is determined that the wearable backplate is in a substantially horizontal orientation.

The light to be emitted from the lighting element in the horizontal orientation may be white light. The light may be illuminated substantially continuously while horizontal. This may give a 'headlight effect' when the user is crawling or is bent over to provide improved visibility. By only illuminating when horizontal, batter power may be preserved when the 'headlights' are not required. The lighting element may also blink intermittently with other colours, while illuminated in the horizontal position, for example as described with respect to the first aspect described above, so as to continue indicating the user or apparatus status.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

In particular, one or both of the first and second aspects may be embodied in the same backplate or breathing apparatus.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 1:
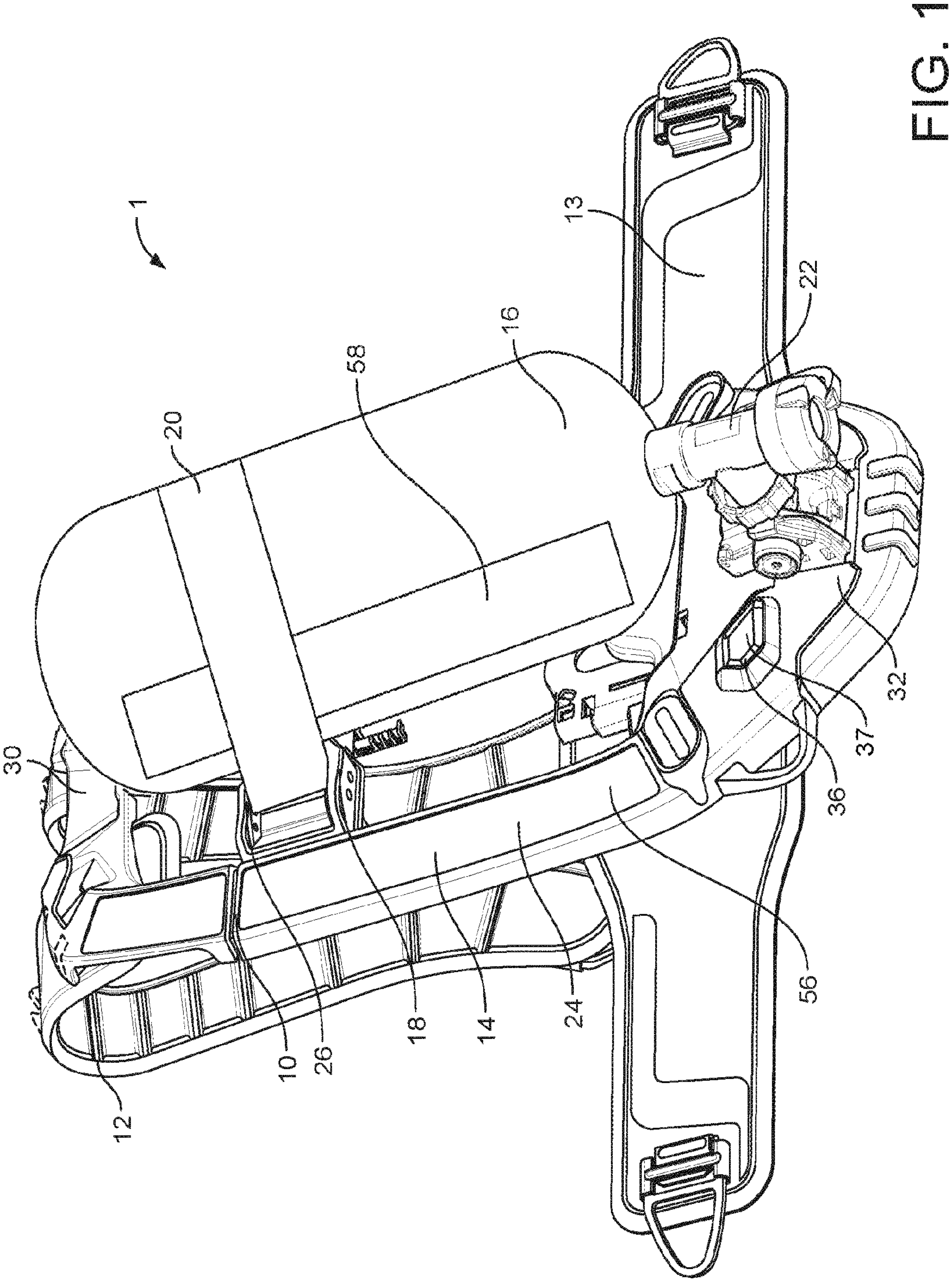
FIG. 1 is a perspective view of a breathing apparatus comprising a wearable backplate.

FIG. 1 shows a breathing apparatus 1. The breathing apparatus 1 comprises a wearable backplate 10, in particular a backplate 10, which is configured to be supported on a user's back with shoulder straps 12 and a waist belt 13. The backplate 12 comprises a frame 14 which extends generally longitudinally. The frame 14 is configured to support a breathing gas cylinder 16 (having a cylinder valve 22) on a centrally positioned cylinder support 18, such that the cylinder 16 is fixed to the backplate. The cylinder support 18 comprises a support strap 20 and a cylinder cradle 28.

The backplate 10 is shown in more detail in FIGS. 2-5, without the shoulder straps 12 and waist belt 13 for ease of understanding. As can be observed, the frame 14 of the backplate 10 comprises two longitudinally extending stanchions 24 on left and right lateral sides of the backplate 10. It should be understood that by "longitudinally extending" it is meant that the part in question is elongate, with its longest dimension being the "longitudinal" direction. The backplate 10, and the frame 14, also extend longitudinally, having a length significantly longer than their width. In use, when the straps 12 and waist belt 13 are donned by a user, the backplate 10, and thus the frame 14, are configured to overlay and be supported on the wearer's back. When the breathing apparatus 1 is worn by the user, the frame 14 (and thus the cylinder 16) extends generally vertically, and approximately parallel to the extension of the user's spine.

The frame 14 also comprises a cross-element 26, which extends laterally between the stanchions 24 and comprises a cylinder cradle 28 on which the cylinder 16 rests. The cylinder cradle 28 forms part of the cylinder support 18, along with the support strap 20 (which urges the cylinder against the cradle 28) and correctly locates the cylinder 16 and its valve 22.

The backplate 10 extends between an upper end 30 and a lower end 32. The upper end 30 is configured to be arranged proximate the user's shoulders in use, as the upper ends of the shoulder straps 12 are fixed to the upper end 30. The lower end 32 is configured to be arranged proximate the user's lower back or waist in use, as the waist belt 13 is fixed to the backplate 10 at the lower end 32. It should be understood that the upper and lower ends are described here in normal use, where the backplate 10 extends generally vertically on a user's back. In such normal use, it will be appreciated that the upper end 30 will be vertically above the lower end 32. In other orientations, the upper and lower ends of the backplate 10 may be arranged in a different relative positions.

Figure 5:
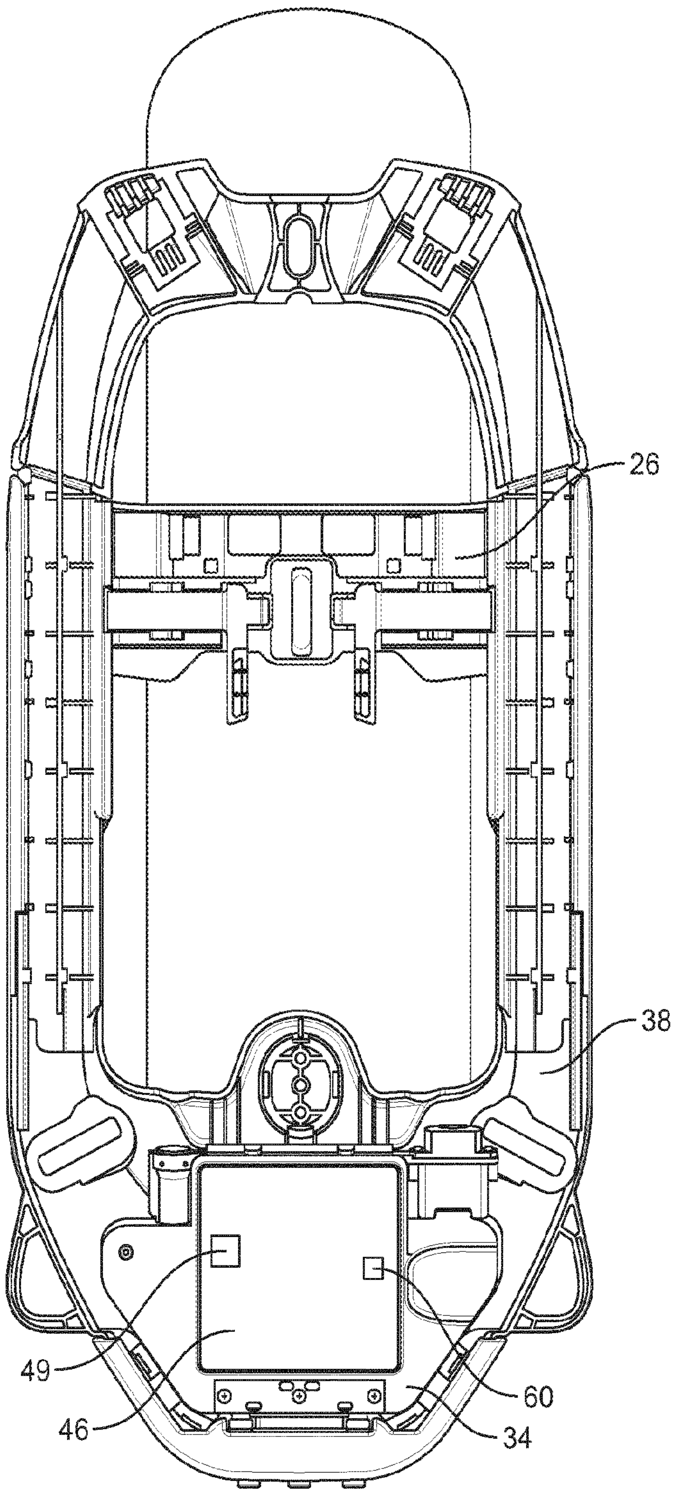
FIG. 5 is a rear view of the backplate of FIGS. 2-4.

In FIG. 5, the rear of the backplate 10 is shown. In use, this side of the backplate 10 would overlay the user's back. At the lower end of the backplate, an electronics module 34 is arranged in a recess in the rear side of the backplate 10. The electronics module 34 houses much of the on-board electronics for the backplate 10, such as a controller, various sensors, and the lighting modules, which will be discussed in more details below. The electronics module 34 is attached to the backplate 10 with removable fixings, such as bolts, so that it can be removed. Thus, the same backplate 10 can be used or sold in an electronic configuration where the backplate 10 comprises the electronics module 34, or a so-called 'mechanical' configuration where the electronic module 34 is not used. By locating much of the electronic components of the backplate 10 in a compact electronics module 34, which is located low down on the backplate, and close to the user's lower back in use, the loading on the user is reduced and the amount of cabling etc. required is minimised.

Figure 6A:
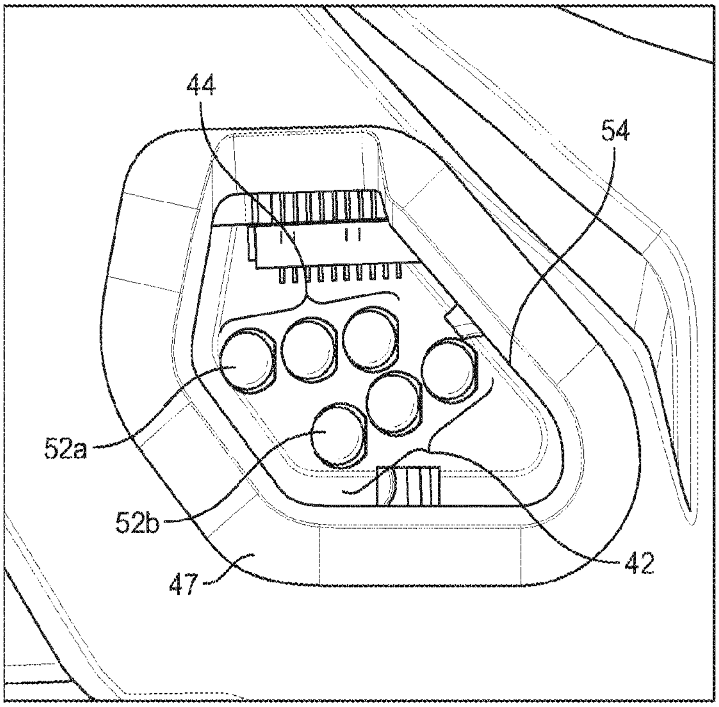
FIGS. 6A and 6B show a detailed views of a lighting module of the backplate, without and with a light pipe.
Figure 6B:
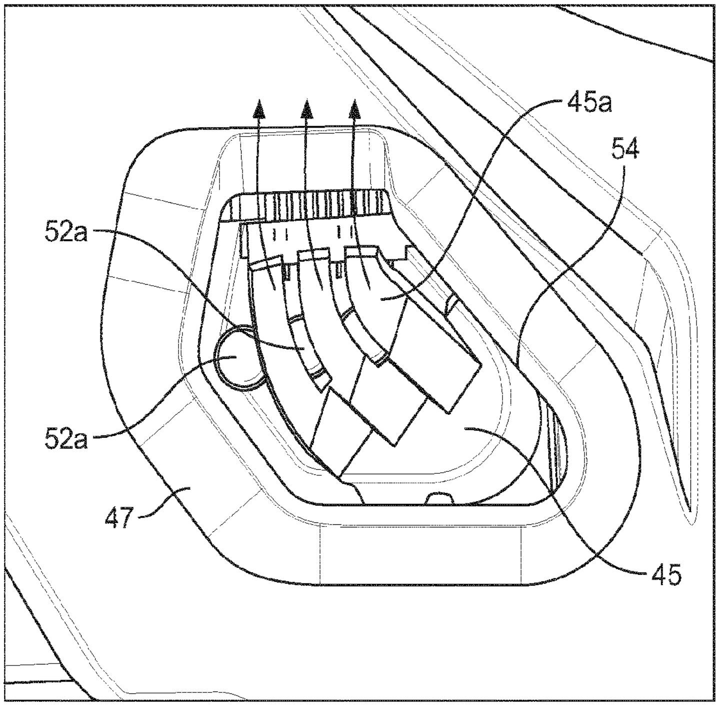
Figure 7:
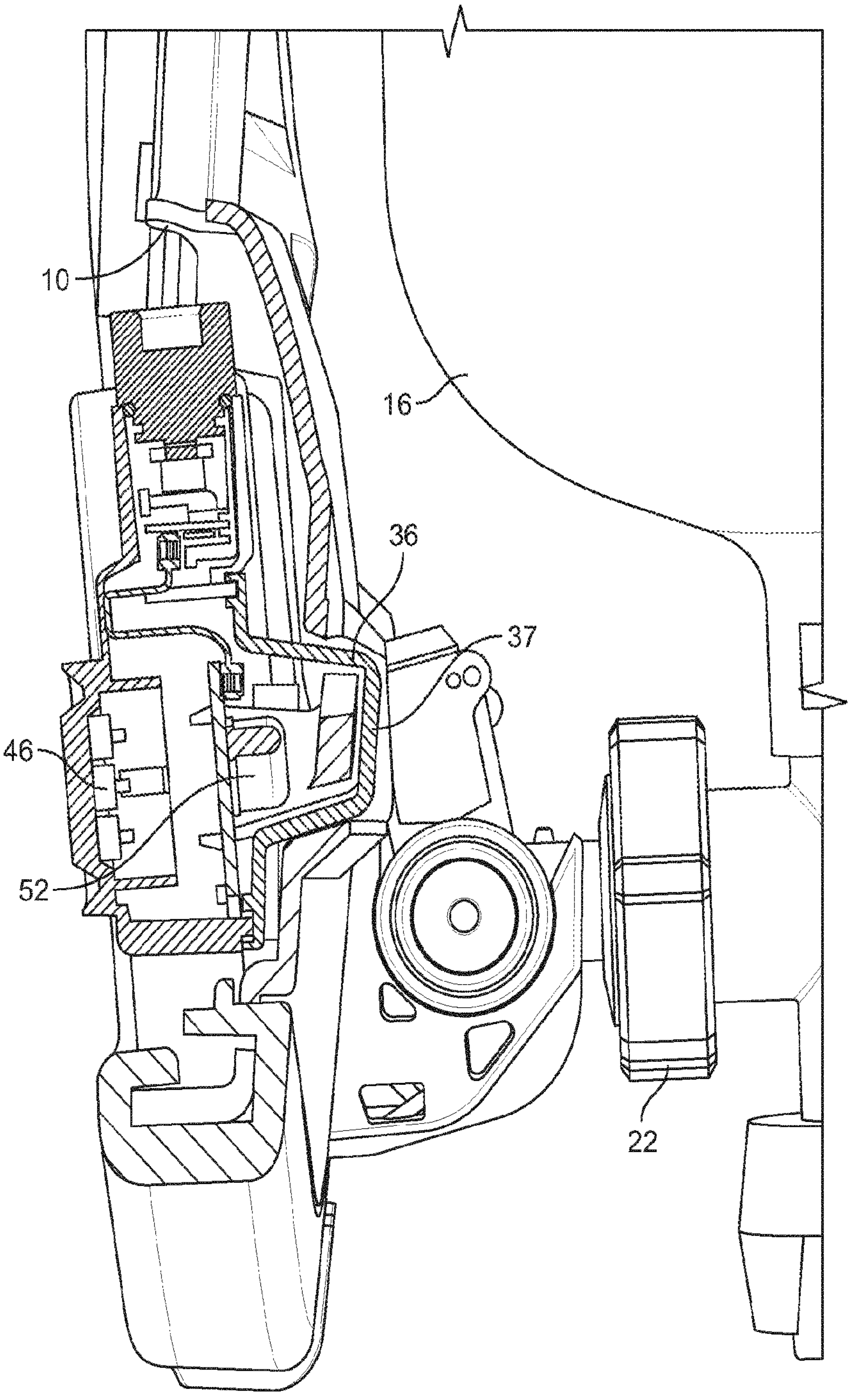
FIG. 7 shows a detailed sectional view of a lighting module and the surrounding portion of the backplate, along the plane A-A shown in FIG. 4.

With reference to FIGS. 6A, 6B, and 7, a lighting system of the backplate 10 will now be described in more detail.

Figure 3:
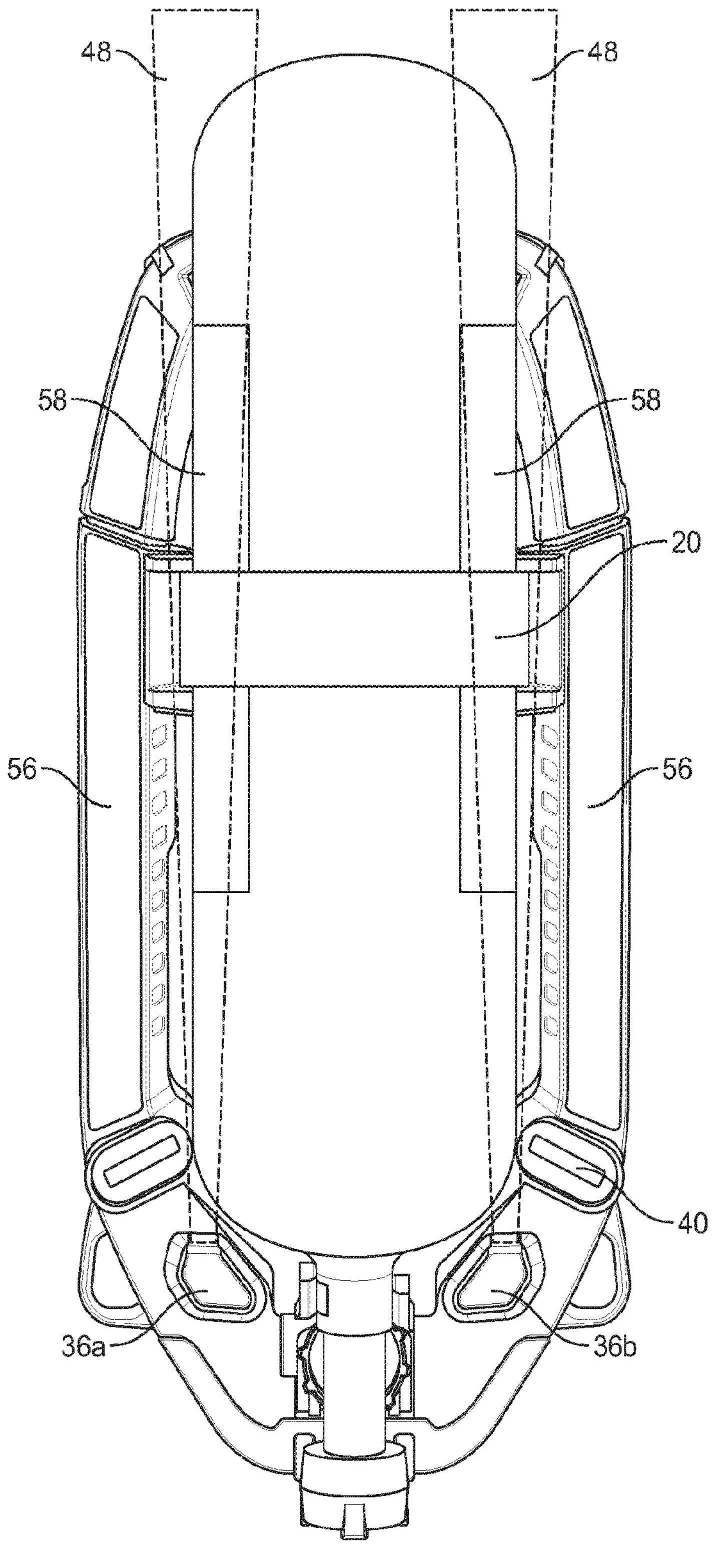
FIG. 3 is a front view of the backplate of FIG. 2.
Figure 4:
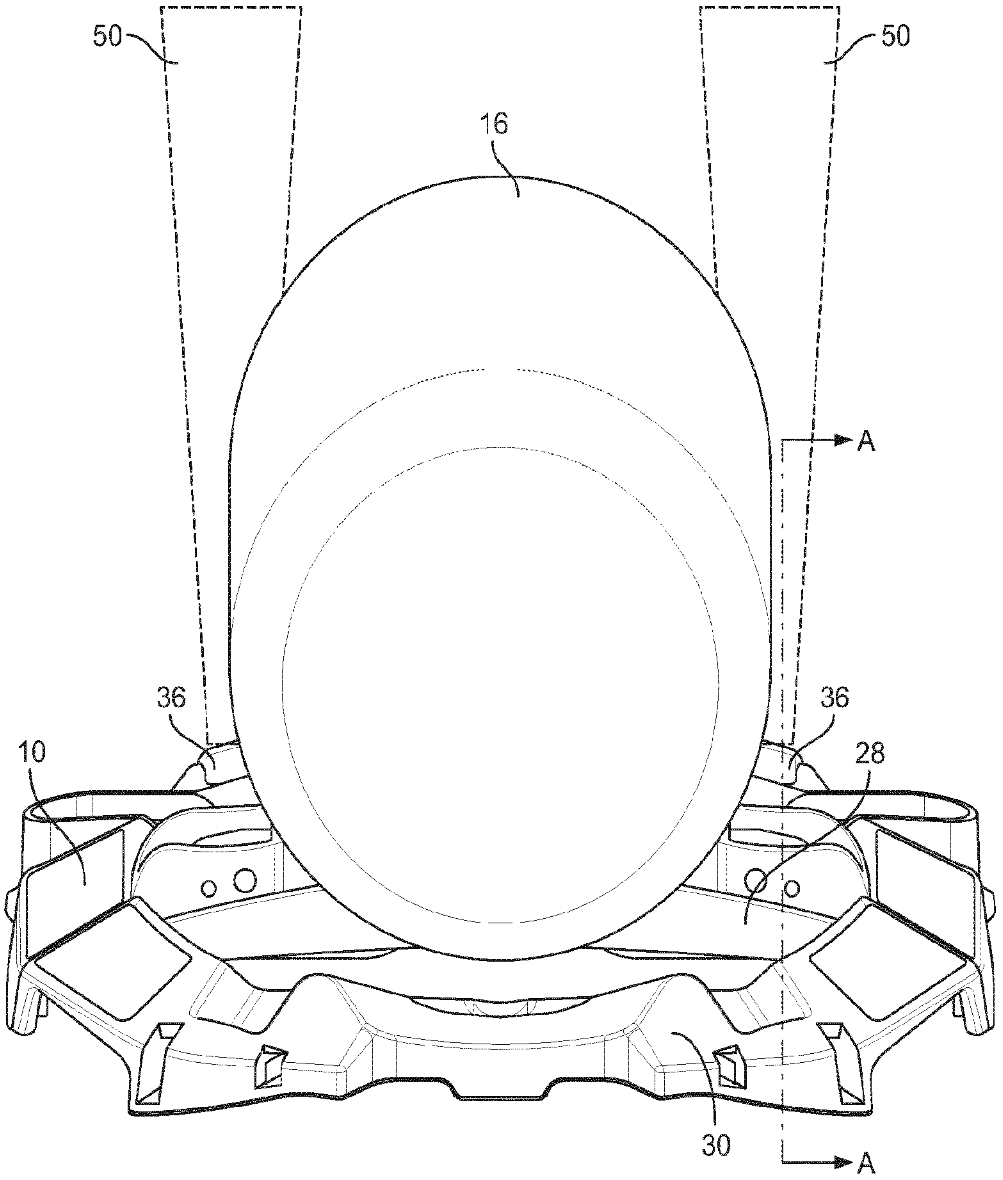
FIG. 4 is a top view of the backplate of FIGS. 2 and 3.

With reference to FIG. 3, the backplate comprises first and second lighting modules 36*a* and 36*b*. The lighting modules 36 are provided on opposing lateral sides of the backplate 10, and in particular on opposing lateral sides of the cylinder support 18. Lighting module 36*a* is arranged on the left side and lighting module 36*b* is arranged on the right side.

As can be seen in FIG. 3, the lighting modules 36 are arranged proximate the lower end 32 of the frame 14. In this example, the lighting modules 36 are arranged below the cylinder support, or below the pressure volume cylinder in use. By 'below' it should be understood that the lighting modules are closer to the lower end of the backplate than the cylinder 16 or the cylinder support 18.

The backplate's user-facing side 38 is visible in FIG. 5 configured to overlay the user's back in use, and the backplate's outward-facing side 40, which is visible in FIG. 3, configured to face away from the user's back in use. The lighting modules 36 are arranged on the outward-facing side 40, and in this example protrude from the outward-facing side 40 of the backplate 10. By protruding from the backplate 10, the lighting modules 36 may be more effective at lighting in directions which are generally parallel to the plane of the backplate 10 (i.e. sideways, up and down).

With reference to FIGS. 6A and 7, each of the lighting modules 36 comprises a vertical lighting array 42 configured to project light longitudinally towards the upper end 30 of the backplate 10 and a horizontal lighting array 44 configured to project light perpendicularly to the backplate (i.e. perpendicularly to the outward-facing side 40).

Figure 2:
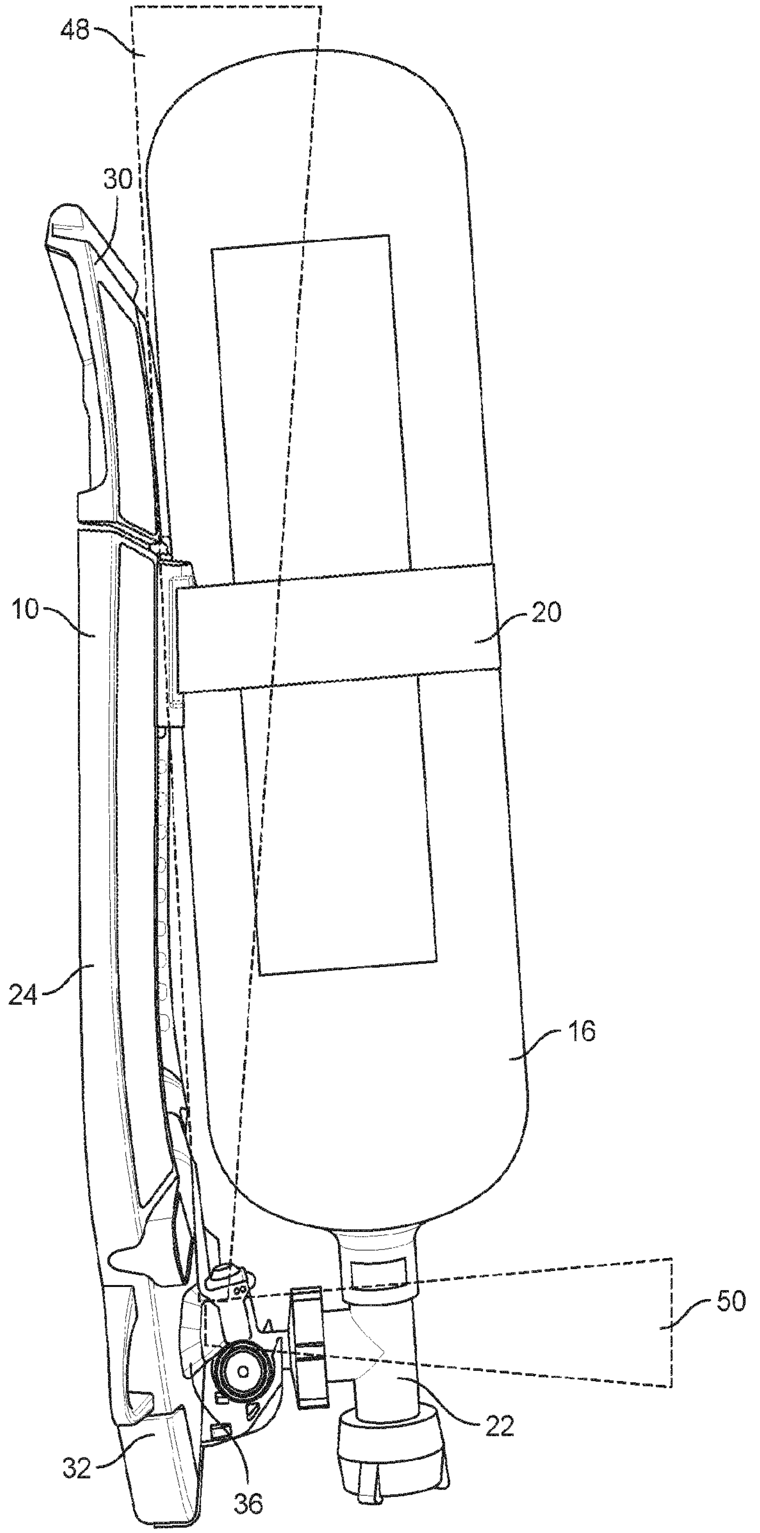
FIG. 2 is a side view of the backplate of FIG. 1.

As shown in FIG. 2, the vertical lighting array 42 is configured to project a light in a generally vertical light arc 48 longitudinally over the backplate 10 and, importantly, beyond the upper end 30 of the backplate 10. It should be understood that the vertical lighting array 42 will cast light in many directions but the construction of the lighting modules 36 is such that the majority of the light cast by the vertical lighting array 42 is directed in a generally upward longitudinal direction.

The horizontal lighting array 44 is configured to project light in a generally horizontal light arc 50 horizontally from the outward facing side 40 of the backplate 10. It should be understood that the horizontal lighting array 44 will cast light in many directions but the construction of the lighting modules 36 is such that the majority of the light cast by the horizontal lighting array 44 is directed in a generally horizontal direction.

The directed vertical and horizontal lighting from the lighting modules 36 provides a highly conspicuous lighting array which is visible from a large number of angles, and even when there is no direct line of sight to the backplate 10.

When the backplate 10, or a portion thereof, is in a direct line of sight, light from the horizontal lighting array 44 will be visible to observers as the lighting modules 36 will be directly visible. Further, components of the backplate 10 which are above the lighting modules 36 will reflect some of the light cast over the backplate 10 by the vertical lighting arrays 42 such that the backplate 10 itself appears to be illuminated. Therefore, even if a direct line of sight to the lighting modules 36 is obscured, the lighting effect should still be perceivable to an observer because the backplate 10 itself will be at least partially illuminated. Further, even if the entire backplate 10 and the user is obscured, for example if a large object is between the observer and the backplate's user, the lighting will still be visible as long as the ceiling above the backplate 10 is visible. Because the vertical lighting arrays 42 cast light vertically past the backplate 10, any ceiling or objects above the backplate 10 and the user will also be illuminated. Therefore, as long as the backplate 10 or an object above the user are directly visible, the lighting on the backplate will be visible and highly conspicuous to observers.

It should be understood that there are various ways to achieve directed lighting from the lighting arrays 42,44. In this example, a particular construction is utilised.

Each lighting module 36 comprises a transparent or translucent cover 37 which houses and protects the lighting arrays 42,44. In this example, the cover 37 is shown as transparent so that the internal construction of the lighting modules 36 can be clearly seen.

Each lighting module 36 is bordered by a peripheral blocking wall 47 which is configured to block the projection of light by the lighting module 36 in some directions. In this example, the peripheral blocking wall 47 extends around the left, right, and lower sides of the lighting module 36, while leaving the upper side and the and the front surface of the lighting module 36 unobscured. Therefore, the blocking wall 47 substantially prevents the projection of light by the lighting module 36 directly laterally (i.e. left and right) and downwards. This construction assists in concentrating the light emitted by the lighting arrays 42,44 in the vertical and horizontal lighting arcs 48,50.

FIG. 6A shows a plan view of the left lighting module 36*a*. In FIG. 6A, a light pipe 45 is omitted in order that the lighting arrays 42,44 can be easily observed. In FIG. 6B, the light pipe 45 is shown so that its operation can be described.

Both the vertical and horizontal lighting arrays comprise three lighting elements 52, in the form of light-emitting diodes 52. The LEDs 52 are arranged in two rows of three, with the upper three, 52*a*, forming the horizontal lighting array 44 and the lower three, 52*b*, forming the vertical lighting array 42. The LEDs 52 in the two arrays are staggered slightly in the lateral direction. As shown in FIG. 6B, the light pipe 45 comprises three 'fingers' 45*a* which precisely overlay the LEDs 52*b* forming the vertical lighting array. The fingers 45*a* of the light pipe 45 are directed vertically, such that light emitted by the LEDs 52*b* of the vertical lighting array enters the fingers 45*a* and is internally reflected by the fingers 45*a* in order to be projected vertically as shown by the arrows in FIG. 6B, so as to form the vertical lighting arc 48.

Because the LEDs 52*a* of the horizontal lighting array 44 are laterally staggered from those of the vertical lighting array 42, the fingers 45*a* of the light pipe 45 do not directly overlay the LEDs 52*a*, and the LEDs 52 are arranged to emit light in the gaps between the fingers 45*a*. Therefore, much of the light emitted by the LEDs 52*a* of the horizontal array 44 is not re-directed by the light pipe 45 and is cast horizontally in the horizontal lighting arc 50. It should be understood that some of the light emitted by both of the lighting arrays 42,44 will serve to illuminate both of the vertical and horizontal lighting arcs 48,50, but each array 42,44 provides a majority of the light for its respective lighting arc.

As mentioned above, the breathing apparatus 1 further comprises a controller 46. The controller 46, in this example, is comprised within the electronics module 34 on the backplate 10. However, in other examples, the controller may be provided in a PASS device connected to the backplate either in a wired or wireless manner, or associated with the breathing apparatus 1 and the lighting modules in some other way.

The controller 46 is in communication with one or more sensors 49 which sense status-indicating information regarding the backplate 10 and/or the user. For example, the sensors may include a pressure sensor to indicate a pressure within the cylinder 16, a motion sensor to indicate whether the user is moving, physiological sensors (such as heart rate, breathing rate sensors etc.) which indicate the physiological state of the user, temperature sensors, battery level sensors, a 'panic button' which the user can activate, an orientation sensor, and so on. It should be understood that the sensor or sensors are configured to generate data which is indicative of a status of the breathing apparatus 1 and/or the user.

The controller 46 is configured to receive data from at least one sensor 49 which is indicative of a status of the breathing apparatus and/or the user. The controller 46 then analyses the data received to determine a status condition of the breathing apparatus and/or the user. Then, the controller 46 controls the lighting modules 36 to illuminate in a lighting pattern which is indicative of the determined status. There are at least two lighting patterns: a first lighting pattern if the determined status condition is a normal status condition and a second lighting pattern if the determined status condition is an alert status condition. It is important that the lighting system indicates a normal status condition, as this may provide reassurance to other personnel that the user is safe and well, and enable more efficient and confident operations by a team of personnel.

A 'normal' status condition should be understood as one in which the breathing apparatus 1 and/or the user are functioning acceptably. For example, a normal status condition may be one in which there is an acceptable level of remaining breathing gas in the cylinder 16 and the user's physiological state is within acceptable limits.

An 'alert' status condition should be understood as one in which the breathing apparatus 1 and/or the user is functioning outside of acceptable limits, such that other service personnel should be alerted to the status of the user. For example, an alert status condition may be one in which there is an unacceptable level of remaining breathing gas in the cylinder 16 and/or the user's physiological state is outside acceptable limits.

In some examples, there may be further granularity of status conditions. For example, the alert status condition may be further divided into a 'pre-alert' condition and a 'full alert' condition, whereby pre-alert indicates that an imminent change into an unacceptable condition (for example, low but not critically low remaining breathing gas), and full alert indicated an unacceptable condition (for example, critically low remaining breathing gas). Different lighting patterns may be provided for different determined status conditions.

In order to enable the communication of various different statuses, the vertical lighting array 42 and the horizontal lighting array 44 each comprise two or more differently coloured lighting elements for emitting light of different colours and, in this example, blue, yellow, and red lighting elements. As discussed below, different lighting patterns may include both different colour lighting and/or different lighting sequences to indicate different statuses, or for different conditions for improved granularity of status indication. In some examples, a distinctive lighting pattern may be used to indicate a specific user, such as a team leader.

Further, different lighting patterns may be combined to indicate concurrent status indications, which might include normal for one or more measured variables, and alert for other measured variables. For example, blinking blue light might indicate acceptable remaining breathing gas, blinking yellow light may indicate low breathing gas, and blinking red light may indicate an excessive heart rate of the user. These different indications could be combined, such that alternately blinking blue and red light indicates concurrent (normal) acceptable remaining gas but (alert) excessive heart rate, while alternately blinking yellow and red lights indicates both (alert) low breathing gas and (alert) excessive heart rate.

Alternatively, for example if only one status is being determined (such as breathing gas remaining), the lighting patterns may be mutually exclusive for simplicity. For example, blinking blue light might indicate acceptable remaining breathing gas, blinking yellow light may indicate low breathing gas, and blinking red light may indicate critically low breathing gas. These statuses would therefore not occur concurrently and can be more easily understood and differentiated by an observer.

In this example, the lighting modules are formed integrally with the electronics module 34. The lighting modules 36 protrude from the electronics module 34 and extend through apertures 54 in the backplate 10 to so as to protrude from the outward-facing surface 40 of the backplate 10. The apertures 54 are surrounded partially by the peripheral blocking walls 47 as described above.

In this example, to further improve visibility of the lighting, various additional components are provided. Longitudinally extending reflective elements 56 are provided on the backplate. The reflective elements are provided on opposing lateral sides of the cylinder support, in particular on the stanchions 24 so as to reflect light projected longitudinally by the vertical lighting array 42. In addition, reflective cylinder elements 58 are provided on opposing lateral sides of the breathing gas cylinder so as to reflect light projected longitudinally by the vertical lighting array 42. In this example, the reflective cylinder elements 58 extend longitudinally along the lateral sides of the breathing gas cylinder 16. In some countries, a cylinder cover or sleeve may be used, so the reflective cylinder elements 58 may alternatively or additionally be provided on a cylinder cover or sleeve.

A further feature of the backplate will now be described. It should be understood that this feature could be provided in addition to the above described lighting system, or separate thereto.

The backplate comprises sensors 49 as described above. In this example, an orientation sensor 60 is provided. The controller 46 is configured to receive data from the orientation sensor 60 and determine the orientation of the backplate, and illuminate the vertical lighting array 42 if it is determined that the wearable backplate is in a substantially horizontal orientation.

The light to be emitted from the lighting element in the horizontal orientation may be white light, for example provide by illuminating all three of the LEDs 52*b* to provide a combined white light colour. The lighting array 42 may be illuminated substantially continuously while horizontal. This may give a 'headlight effect' when the user is crawling or is bent over while wearing the backplate 10, which may provide improved visibility of the environment ahead of the user. When the backplate 10 is in a horizontal position, it should be understood that the vertical lighting array 42 then actually directs light in a forward direction. By only illuminating when horizontal, battery power may be preserved when the 'headlights' are not required. The lighting arrays 42,44 may also, while illuminated in the horizontal position, continue to illuminate in the status-indicating light patterns as described above, so as to continue indicating the user or apparatus status.

By providing a lighting system as disclosed herein, improved lighting and status indication may be achieved without significantly increasing the battery power consumption rate. It should be understood that by providing the lighting modules in the particular locations at the lower end of the backplate and by directing the light effectively, a lesser number of lighting modules can illuminate both the backplate itself and objects above the backplate. In prior art systems, conspicuous lighting has only been achieved by providing a large number of lighting locations on the backplate, which is inefficient, heavy, and consumes additional power. Further, illuminated status indication has historically only been provided for 'alert' statuses. As the presently disclosed backplate uses lighting more efficiently, reduced battery consumption levels may then permit 'normal' status to be indicated conspicuously without fear of exhausting battery capacity too quickly.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

Unless otherwise stated, orientation based terms, such as lower, upper, down, up, lateral, left, right, forward and backward, should be interpreted in the usual position of the breathing apparatus or backplate in use, i.e. on a user's back when the user is standing upright. Therefore, a term such as "vertically upward" should be construed as pointing away from the earth's surface, unless otherwise stated.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

The invention claimed is:

1. A breathing apparatus comprising:
a wearable backplate comprising:
a longitudinally extending frame configured to be supported on a user's back, the frame comprising a cylinder support for supporting a breathing gas cylinder, and having an upper end configured to be arranged proximate the user's shoulders in use and a lower end configured to be arranged proximate the user's lower back or waist in use;
first and second lighting modules on opposing lateral sides of the cylinder support, the lighting modules comprising a vertical lighting array configured to project light longitudinally towards the upper end of the backplate;
wherein the vertical lighting array comprises a light director for directing light from a lighting element longitudinally towards the upper end of the backplate; and
a controller configured to:
receive data indicative of a status of the breathing apparatus and/or the user;
determine a status condition of the breathing apparatus and/or the user; and
control the lighting modules to illuminate in:
a first lighting pattern if the determined status condition is a normal status condition; and
a second lighting pattern if the determined status condition is an alert status condition.

2. The breathing apparatus as claimed in claim 1, wherein the first and second lighting modules are arranged proximate the lower end of the frame.

3. The breathing apparatus as claimed in claim 1, wherein the first and second lighting modules comprise both the vertical lighting array configured to project light longitudinally towards the upper end of the backplate and a horizontal lighting array configured to project light perpendicularly to the backplate.

4. The breathing apparatus as claimed in claim 3, wherein the horizontal lighting array comprises the light director configured to project light perpendicularly to the backplate.

5. The breathing apparatus as claimed in claim 1, comprising an electronics module which comprises the lighting modules, the controller, and a battery, optionally wherein the electronics module is a removable module.

6. The breathing apparatus as claimed in claim 1, wherein the vertical lighting array and/or a horizontal lighting array each comprise two or more differently coloured lighting elements for emitting light of different colours.

7. The breathing apparatus as claimed in claim 1, further comprising one or more longitudinally extending reflective elements on the wearable backplate.

8. The breathing apparatus as claimed in claim 7, wherein the one or more longitudinally extending reflective elements comprise first and second reflective elements that are provided on opposing lateral sides of the cylinder support so as to reflect light projected longitudinally by the vertical lighting array.

9. The breathing apparatus as claimed in claim 1, wherein the wearable backplate comprises a user-facing side configured to overlay the user's back in use, and an outward-facing side configured to face away from the user's back in use, and wherein the lighting modules protrude from the outward-facing side of the backplate.

10. The breathing apparatus as claimed in claim 9, wherein each lighting module is bordered at least partially by a peripheral blocking wall which is configured to block the projection of light by the lighting module in some directions.

11. The breathing apparatus as claimed in claim 10, wherein the peripheral blocking wall extends around a lower side and left and right sides of each lighting module to such that the lighting modules are configured to project light substantially longitudinally towards the upper end of the backplate and substantially perpendicular to the outward-facing side of the backplate.

12. The breathing apparatus as claimed in claim 1, further comprising the breathing gas cylinder arranged on the cylinder support, wherein one or more reflective elements are provided on the breathing gas cylinder and/or on a cover for the breathing gas cylinder, for reflecting light emitted by the lighting modules.

13. The breathing apparatus as claimed in claim 12, wherein the one or more reflective elements comprise first and second reflective cylinder elements that are provided on opposing lateral sides of the breathing gas cylinder and/or cover so as to reflect light projected longitudinally by the vertical lighting array, optionally wherein the first and second reflective cylinder elements extend longitudinally along the lateral sides of the breathing gas cylinder and/or cover.

14. A breathing apparatus comprising:

a wearable backplate comprising:

a longitudinally extending frame configured to be supported on a user's back, the frame comprising a cylinder support for supporting a breathing gas cylinder, and having an upper end configured to be arranged proximate the user's shoulders in use and a lower end configured to be arranged proximate the user's lower back or waist in use; and a lighting element configured to project light longitudinally towards the upper end of the backplate;

an orientation sensor; and a controller configured to receive data from the orientation sensor and determine the orientation of the backplate and illuminate the lighting element if it is determined that the wearable backplate is in a substantially horizontal orientation.

* * * * *